(12) United States Patent
Spray

(10) Patent No.: US 7,730,666 B2
(45) Date of Patent: Jun. 8, 2010

(54) PLANT CONTAINER WITH WATERING SYSTEM

(76) Inventor: David Allen Spray, 10006 Dunbarton Dr., Huntsville, AL (US) 35803

( * ) Notice: Subject to any disclaimer, the term of this patent is extended or adjusted under 35 U.S.C. 154(b) by 376 days.

(21) Appl. No.: 11/824,286

(22) Filed: Jun. 29, 2007

(65) Prior Publication Data

US 2008/0110089 A1    May 15, 2008

Related U.S. Application Data

(60) Provisional application No. 60/857,978, filed on Nov. 9, 2006.

(51) Int. Cl.
*A01G 25/00*    (2006.01)
*A01G 9/02*    (2006.01)

(52) U.S. Cl. .................. 47/79; 47/65.5; 47/81

(58) Field of Classification Search ............ 47/79, 47/80, 81, 82, 65.5, 65, 66.6, 66.1, 86, 62 R, 47/48.5
See application file for complete search history.

(56) References Cited

U.S. PATENT DOCUMENTS

| | | | |
|---|---|---|---|
| 267,296 A | 11/1882 | Wilder |
| 1,815,676 A | 7/1931 | Medveczky |
| 2,084,005 A | 6/1937 | Richards |
| 2,288,678 A | 7/1942 | Blumentritt |
| 2,499,885 A | 3/1950 | Sommer |
| 2,519,166 A | 8/1950 | White |
| 3,067,543 A | 12/1962 | Bracey |
| 3,557,490 A | 1/1971 | Delaney |
| 3,733,746 A | 5/1973 | Allen, Jr. |
| 3,753,315 A | 8/1973 | Adam |
| 3,758,987 A | 9/1973 | Crane, Jr. |
| 3,783,555 A | 1/1974 | Peters |
| 3,903,644 A | 9/1975 | Swift et al. |
| 3,958,366 A | 5/1976 | Meyers |
| 4,001,967 A | 1/1977 | Switf et al. |
| 4,067,143 A | 1/1978 | Alwell |
| D250,401 S | 11/1978 | O'Shea et al. |

(Continued)

OTHER PUBLICATIONS

Gardner's Supply Company, Burlington Vt., "Don't Hang Your Plants Out to Dry", www.Gardner's.com, web page, printed Aug. 19, 2006.

(Continued)

*Primary Examiner*—Michael R Mansen
*Assistant Examiner*—Monica Williams
(74) *Attorney, Agent, or Firm*—James Richards (57) ABSTRACT

A double walled plant container wherein the two walls or shells form a space for holding water. The outer wall may include a window for viewing water level. The container includes a combination watering funnel and handle arrangement at the top of the container. The watering funnel protrudes or extends from the outer perimeter of the characteristic shape of the container to allow grip of the container for carrying. Preferably two watering funnel and handle structures are included, one each on opposite sides of the container. The rim arrangement allows for convenient carrying without separating the container components. The bottom of the inner shell includes holes for conducting water from the water reservoir into the soil and may include a fiber wick and soil stop barrier to prevent entry of soil into the space between the two walls and to allow water to conduct by capillary action or otherwise into the soil.

20 Claims, 7 Drawing Sheets

U.S. PATENT DOCUMENTS

| | | | |
|---|---|---|---|
| 4,171,593 A | | 10/1979 | Biggelstone |
| 4,198,784 A | | 4/1980 | Sukert |
| 4,219,967 A | | 9/1980 | Hickerson |
| 4,236,352 A | | 12/1980 | Heaney et al. |
| 4,343,109 A | * | 8/1982 | Holtkamp ................ 47/81 |
| 4,571,883 A | | 2/1986 | Shaw |
| 4,741,125 A | | 5/1988 | Demorest |
| 4,745,707 A | | 5/1988 | Newby |
| 4,756,121 A | | 7/1988 | Wild |
| 4,829,709 A | | 5/1989 | Centrafanti |
| 4,885,870 A | | 12/1989 | Fong |
| 4,916,858 A | | 4/1990 | Hobson |
| 4,962,613 A | | 10/1990 | Nalbandian |
| 4,993,186 A | | 2/1991 | Immonen |
| 5,044,120 A | | 9/1991 | Couch |
| 5,058,319 A | | 10/1991 | Liao |
| 5,099,609 A | | 3/1992 | Yamauchi |
| D331,549 S | | 12/1992 | Embree |
| 5,168,664 A | | 12/1992 | Deutschmann, Sr. |
| 5,315,783 A | | 5/1994 | Peng |
| 5,644,868 A | | 7/1997 | Lui |
| 5,782,035 A | | 7/1998 | Locke et al. |
| 5,860,249 A | | 1/1999 | Holtkamp, Jr. |
| 5,918,415 A | | 7/1999 | Locke et al. |
| 5,921,025 A | | 7/1999 | Smith |
| 6,138,411 A | | 10/2000 | Lin |
| 6,145,250 A | | 11/2000 | Mai |
| 6,226,920 B1 | | 5/2001 | Myers |
| 6,357,179 B1 | | 3/2002 | Buss |
| 6,363,658 B1 | | 4/2002 | Lai |
| 6,370,819 B1 | | 4/2002 | Reiss et al. |
| D462,297 S | | 9/2002 | Rollins |
| 6,505,440 B1 | | 1/2003 | Lai |
| 6,584,730 B1 | | 7/2003 | Mai |
| 6,715,233 B2 | | 4/2004 | Lyon |
| 6,782,659 B2 | | 8/2004 | Van Laere |
| 6,880,484 B1 | | 4/2005 | Lee |
| 6,962,022 B2 | | 11/2005 | Shannon |
| 6,986,224 B2 | | 1/2006 | Gelfer |

OTHER PUBLICATIONS

Gardner's Supply Company, Burlington Vt., "Italian Style Planters Have the Look of Metal without the Cost", www.Gardner's.com, web page, printed Aug. 19, 2006.

Gardner's Supply Company, Burlington Vt., "Design your own terrace garden", www.Gardner's.com, web page, printed Aug. 19, 2006.

Gardner's Supply Company, Burlington Vt., "Our Self Watering EZ Care Pots Just Won't Dry Out", www.Gardner's.com, web page, printed Aug. 19, 2006.

* cited by examiner

PLANT CONTAINER WITH WATERING SYSTEM

RELATED APPLICATIONS

This application claims the benefit under 35 USC 119(e) of prior U.S. Provisional Application 60/857,978, titled "Plant Growing System," filed Nov. 9, 2006 by David Allen Spray, which is incorporated herein by reference in its entirety.

BACKGROUND

1. Field of the Invention

The present invention pertains generally to the field of plant husbandry devices and systems, more particularly to the field of self watering plant containers.

2. Background of the Invention

A traditional plant container (alternatively referred to as a pot) typically comes as two parts, the pot itself and a separate saucer. The two piece construction presents certain difficulties in use. Specifically, the two pieces are handled as separate items. If it is desired to move a plant, the pot and saucer are moved separately, i.e., if both hands are necessary to carry the plant, the saucer is carried on a separate trip. If one hand may carry the pot, the other hand carries the saucer, preventing the other hand from carrying another plant. Thus, if many plants must be moved, the separate saucer multiplies the work.

In another aspect, the pot is usually watered from the top, saturating the top of the soil. For some plants and soils, this encourages insects and molds. Watering through the bottom has a further advantage in promoting root growth. To water a plant in the saucer, the water must be directed to a narrow space between the pot and saucer—difficult to accomplish if watering from a pail. A spigot is typically required to reach the saucer. The saucer being located below the plant offers further difficulties in directing the water to the saucer.

Specialized plant pots have been developed to address some of these issues. In one approach, the saucer is attached to the pot. Attached saucers often fit too close for bottom watering. In one approach a port or opening is provided at the bottom of the pot to allow filling the saucer. Again the location at the bottom of the pot and the side watering require special watering apparatus and dexterity. When carrying pots with attached saucers, a slight tilt in the assembly will typically spill water out of the saucer, necessitating careful handling.

In another approach, a series of self watering pots may have an enclosed space for water to be displaced by air as the water is used. These pots must be carefully sealed and require individual attention to remove air tight caps to add water. Because the pots must be air tight, disassembly for cleaning is difficult or not feasible.

Therefore there is a need for a plant pot with a water reservoir to extend the time between watering, a plant pot that allows watering without saturating the surface of the soil and that can be carried conveniently as a single assembly.

BRIEF DESCRIPTION OF THE INVENTION

Briefly, the present invention pertains to a double walled plant container wherein the two walls or shells form a space for holding water. The outer wall may include a window for viewing water level. The container includes a combination watering funnel and handle arrangement at the top of the container. The watering funnel protrudes or extends from the outer perimeter of the characteristic shape of the container to allow grip of the container for carrying. Preferably two watering funnel and handle structures are included, one each on opposite sides of the container. The rim arrangement allows for convenient carrying without separating the container components. The bottom of the inner shell includes holes for conducting water from the water reservoir into the soil and may include a fiber wick and soil stop barrier to prevent entry of soil into the space between the two walls and to allow water to conduct by capillary action or otherwise into the soil.

In one embodiment, the upper shell may include a rim at the top of the upper shell and extending horizontally to cover the space between the upper shell and lower shell. The rim may have a hole aligned with the watering funnel extension to allow entry of water into the water reservoir. Alternatively, the extension may extend beyond the upper shell rim allowing watering directly into the funnel structure.

In a further embodiment, the upper shell has a lip extending downward at the upper outer edge of the upper shell. The lip may contact the lower shell for aligning the upper and lower shells relative to one another.

In a further embodiment, the upper shell or lower shell may include a stay for contacting the other shell for aligning the two shells laterally and or vertically. The upper and lower shells may be held in contact by friction. Alternatively, the two shells may be permanently bonded by adhesive or by plastic welding or other means.

In a further embodiment, the upper or lower shell may include a spacer to space the bottom of the upper shell and bottom of the lower shell. The upper shell may include holes for passage of water from the water reservoir to the upper shell cavity containing growing medium for the plant.

In a further embodiment of the invention, a method for plant husbandry is disclosed comprising forming a plant container comprising two shells, forming an extension in the side of the outer shell. The extension extending beyond the characteristic shape of the container. The extension may be used for introduction of water into the water reservoir between the two shells and may be used as a handle for carrying the container.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention relates to a dual wall plant container (alternatively referred to as a pot) including a water reservoir for storing water to reduce the frequency of watering. The pot is of two piece construction, allowing the use of low cost materials available in a wide verity of colors and patterns. The invention is well suited to be manufactured in plastic such as ABS or other plastics. Other suitable materials may also be used. The pot may include a window for viewing the water level to determine if watering is necessary and to regulate the amount of water in the reservoir. The pot also includes one or more funnels for placing water directly into the reservoir to maintain clean water in the reservoir. Watering through the reservoir has the added advantage of providing water through capillary action to the roots without saturating the surface of the soil in the pot, reducing insects, parasites, and moulds. The watering funnel is formed as an integral part of the outer shell. The funnel structures, typically a pair of structures on opposite sides of the pot, also serve as handles for easier lifting of the pot while keeping the pot upright. When carried, the water reservoir and pot are carried as one, without spilling water. Typical prior art pots have a separate dish and are carried as two parts and are often tilted, spilling water as they are carried.

The watering funnel is placed at the top of the pot at the outer edge, outside the perimeter of the inner soil containing shell. The top outside placement of the watering funnel is convenient for use with watering containers of all types including buckets and pitchers with and without a spout. Some plant pots with watering ports at the bottom are not easily used with watering buckets that do not have a spout. Further, in some usage configurations, the spout must tilt to reach the ground without delivering water to avoid spilling water outside the pot.

The rim is constructed with a lip as part of the outside shell. The lip further aids in carrying the pot without separating the top and bottom shells. A person's hands may grip either the handles or the lip to carry the pot.

In one embodiment, the inner and outer shells may be permanently joined by glue or plastic welding or otherwise to form a single unit for convenience.

In an alternate embodiment, the inner and outer shells may be separated. The two shells may snap together for convenience in shipping and marketing. In use, gravity will naturally keep the two shells properly in place. Locating tabs or stays are provided for keeping the two shells aligned. The shells may be separated for cleaning. The outer shell, particularly the water level window, may be cleaned periodically. In a separated configuration with the lower shell temporarily removed, the plant may be periodically desalted by watering continuously through the top of the soil, allowing the water to drain out the bottom of the pot. Soil typically accumulates salts and water deposits over time, and flushing water through the soil in this manner eliminates these deposits and refreshes the plant.

The present invention will now be described in greater detail with reference to the drawings.

Figure 1:
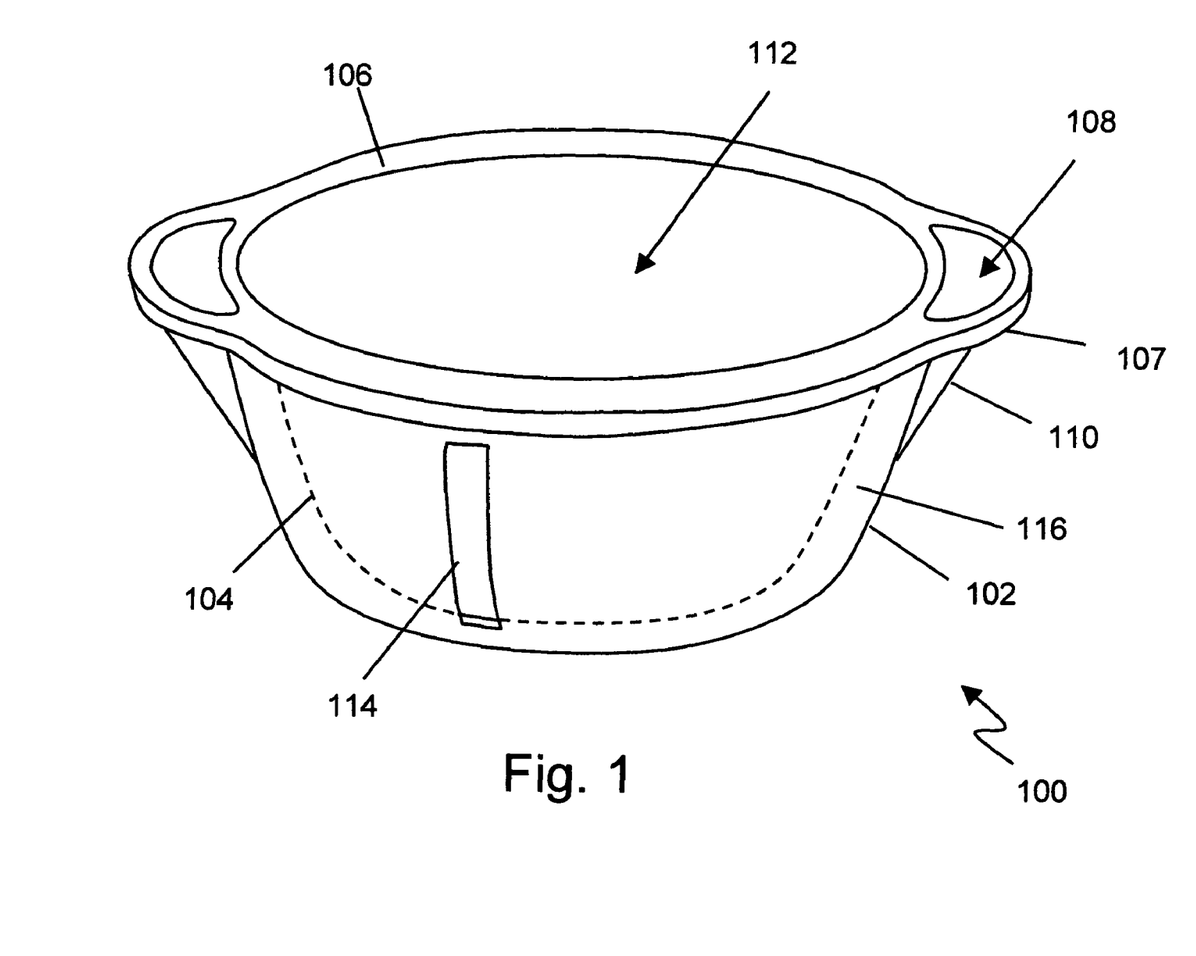
FIG. 1 is a top perspective view of an exemplary plant container in accordance with the present invention.

FIG. 1 is a top perspective view of an exemplary plant pot in accordance with the present invention. Referring to FIG. 1, the plant pot 100 comprises a top shell (see FIG. 3, 300) and a bottom shell (see FIG. 4, 400). The top shell 300 comprises a body portion 104 that forms a cavity 112 for the soil. The top shell 300 includes a top rim 106 and lip 107 surrounding the top of the soil cavity 112. The bottom shell 400 has a cavity for receiving the top shell body 104. The bottom shell 400 includes spacers in the bottom to support the base of the top shell (see FIG. 4). The bottom shell 400 also includes a bottom rim 210 and lip 212 (see FIG. 2) around the top of the soil cavity 112. The bottom shell rim and lip and top shell rim and lip are made to mate around the perimeter. Alignment spacers, also referred to as stays, may be formed into the top shell 300 to aid in mating the two shells 300, 400.

When mated together, a space 116 between the two shells may be used as a water reservoir to hold water for an extended period of time to reduce the frequency of watering. The bottom shell 102 may also include a transparent window 114 for viewing the level of water in the reservoir 116.

The bottom shell 102 includes two radial protrusions 110, alternatively referred to as extensions 110, one each on opposite sides of the bottom shell 102. The protrusions 110, together with mating openings 108 in the rim 106 of the top shell 104 form combination watering funnel and handle structures 110. The top rim includes a watering port 108 for access to the funnel. The number of protrusions and resulting watering funnels may be varied as desired.

Figure 2:
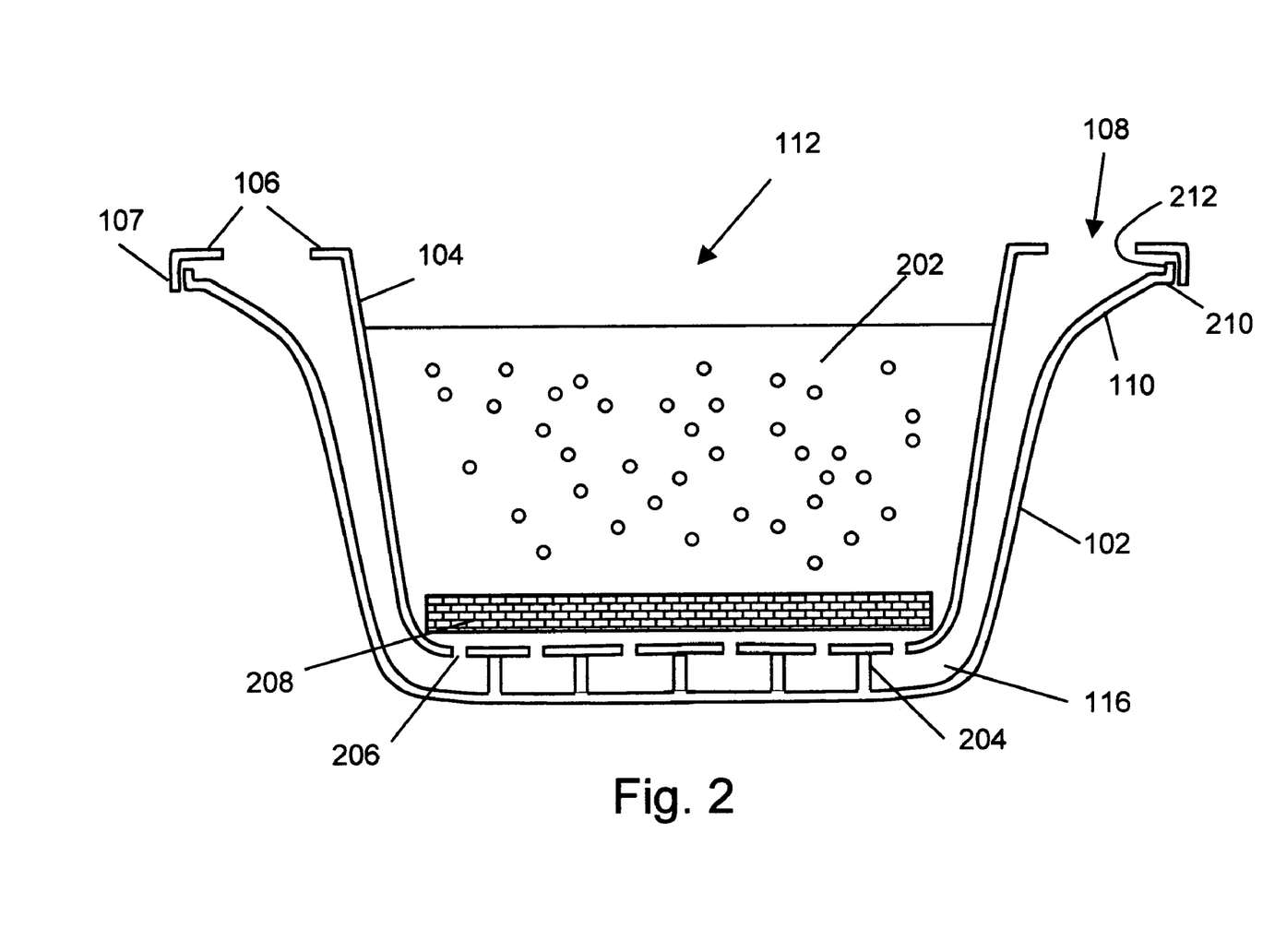
FIG. 2 is a cross section drawing of the plant container of FIG. 1.

FIG. 2 is a cross section drawing of the plant pot of FIG. 1. Referring to FIG. 2, the upper shell 300 comprises a soil cavity forming portion 104 (body portion 104) and a rim 106 and lip 107. The rim portion 106 includes a watering port entry 108 to the watering funnel 110. The watering funnel may direct water to the water reservoir 116. The bottom of the upper shell 300 has holes 208 for conduction of water from the water reservoir 116 to the soil cavity 112. The lower shell 400 comprises a cavity forming portion 102 for receiving the upper shell 104 and a lower shell rim portion 210 and lip 212. The cavity forming portion 102 includes two protrusions 110 that form combination watering funnel and handle structures 110. The lower sell 102 also includes spacers 204 for supporting the bottom of the upper shell 104. The space between the upper and lower shells forms a water reservoir 116. In one embodiment, a fiber pad 208 may be placed in the bottom of the upper shell 104 to prevent soil from falling through the holes 206 and into the water reservoir 116 and to aid in conduction of water from the reservoir 116 to the soil 202 by capillary action. In one embodiment, the fiber pad 208 may extend from the soil cavity 112 into the water reservoir 116 to further conduct water by capillary action. Although not shown in this cross section, the lower shell 102 may include a transparent or translucent window 114 for viewing the level of water in the water reservoir 116.

Figure 3:
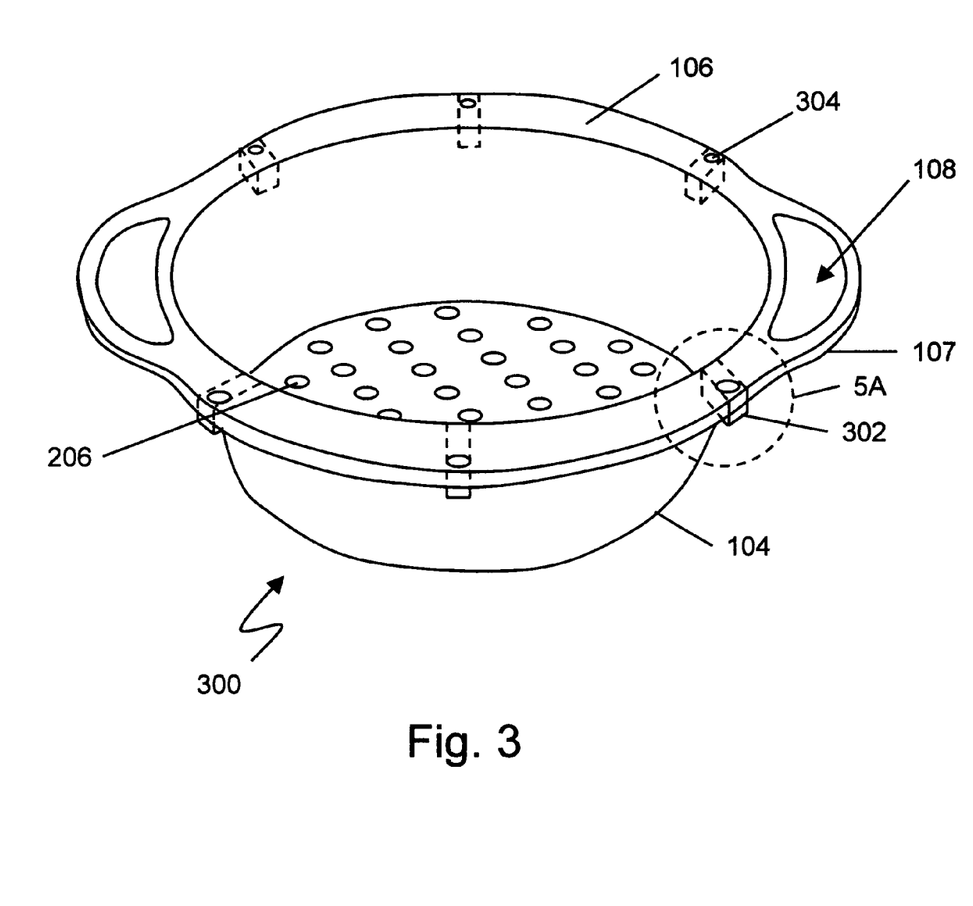
FIG. 3 is a perspective view of the upper shell of the plant container of FIG. 1.

FIG. 3 is a perspective view of the upper shell 300 of the plant pot of FIG. 1. In a preferred embodiment, the upper shell 300 may be fabricated as a single unit by molding the upper shell 300 in plastic. The view of FIG. 3 is tilted slightly from FIG. 1 to show the holes 206 in the bottom of the upper shell 104 that allow water to enter the soil cavity from the reservoir 116. Also shown are stays 302, or spacers in the rim 106 of the upper shell 300 that align the upper shell 300 to the rim 210 and lip 212 of the lower shell 400. Six stays 302 are shown, however, the number may be varied as desired. Other techniques for aligning and connecting the upper and lower shells may be used. Also shown are holes 304 at the site of the stays 302 for attaching a hangar for hanging the pot, if desired. Other hole arrangements and other techniques may be used for attaching and hanging the pot 100.

Figure 4:
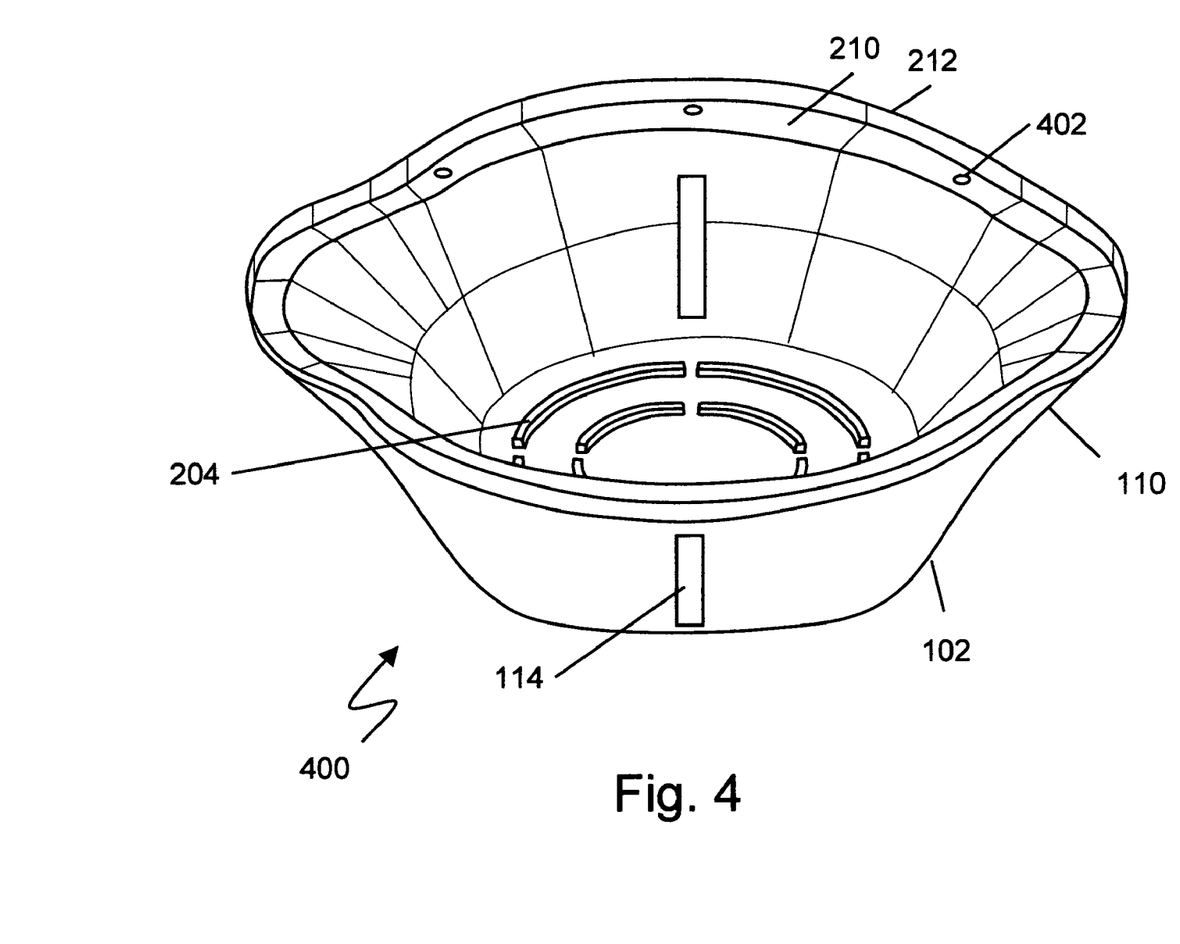
FIG. 4 is a perspective view of the lower shell of the plant container of FIG. 1.

FIG. 4 is a perspective view of the lower shell 400 of the plant pot of FIG. 1. In a preferred embodiment, the lower shell 400 may be fabricated as a single unit by molding the lower shell 400 in plastic. The lower shell is water tight for holding water in the water reservoir. Referring to FIG. 4, the lower shell 400 comprises a lower body portion 102, a rim 210 and lip 212. The combination funnel and handle structures 110 can be seen to be formed by a change in the slope of the sides of the body portion 102. The funnel and handle is thus an extension of the characteristic shape of the lower shell, i.e., if the lower shell is round, the funnel is in extension from the round shape, resulting in a round shape with handles. The extension is preferably formed with substantially the same thickness material as the remainder of the pot and is substantially continuous with the rest of the pot. The funnel has preferably an upward facing opening for watering. The rim 210 and lip 212 follow the resulting upper perimeter of the body portion 102. The rim 210 and lip 212 mate with the rim 106 and lip 107 of the upper shell 300. The stays 302 of the upper shell rim 106 fit within the lip 212 of the lower shell. Holes 402 are provided in the rim 210 for attaching a hanger for hanging the pot. The lower shell holes 402 are aligned with the upper shell holes 304 to allow the pass through of wires, strings or hooks as desired for hanging the pot.

Also shown are two transparent windows 114 for viewing the level of the water in the reservoir 116. The transparent windows 114 may be molded into the lower shell 400 or adhesively attached or plastic welded as desired. Stands, also referred to as spacers 204, are provided to support the bottom of the upper shell 104. Alternatively the stands may be fabricated into the upper shell 300.

Figure 5A:
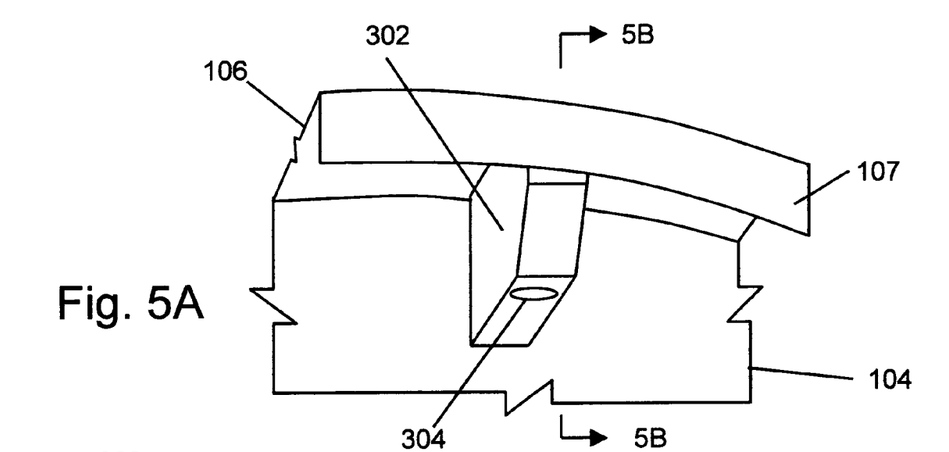
FIGS. 5A, 5B, 5C and 5D show various views and versions of stays that couple the upper shell and lower shell at the rim.
Figure 5B:
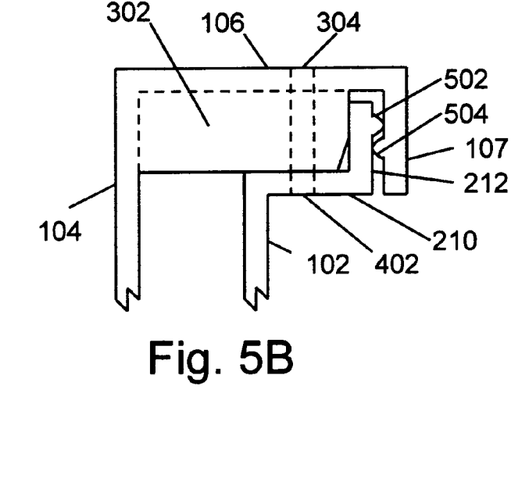
Figure 5C:
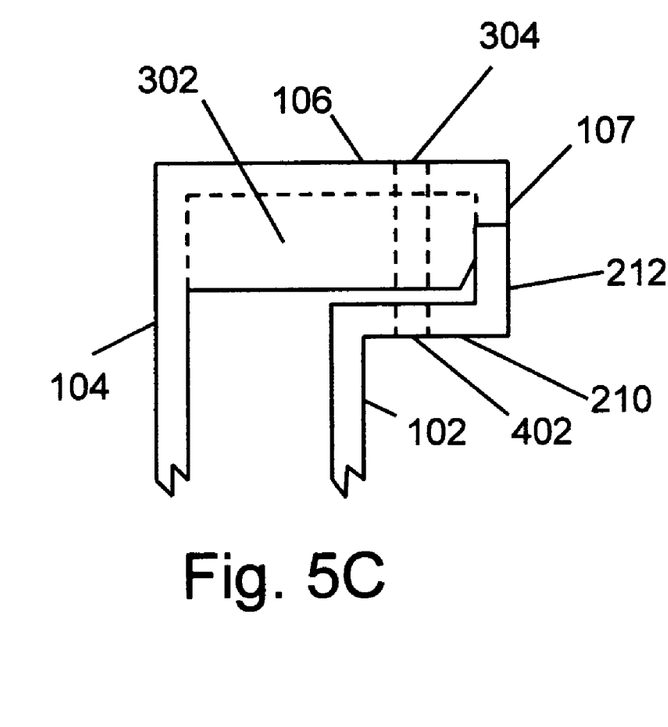

FIGS. 5A, 5B, and 5C show various views of one of the stays that couple the upper shell and lower shell at the rim. FIG. 5A is a perspective view of the stay 302 of FIG. 3. The stay 302 is a spacer affixed to or molded with the upper shell 104. Shown is a portion of the rim 106 and a portion of the body 104 of the upper shell with the stay 302 positioned between them. The operation of the stays 302 may be better understood from FIG. 5B.

FIG. 5B is a cross section of the stay of FIG. 5A through a vertical plane through the center of the pot 100. FIG. 5B shows the stay 302 and the upper shell body 104, rim 106 and lip 107 as well as the lower shell body 102, rim 210 and lip 212. The lower shell lip 210 fits between the stay 302 and the upper shell lip 107. The upper shell 300 is supported at the rim 106 vertically through the stay 302 to the rim 210 of the lower shell 400. The upper shell 300 is positioned laterally by the rim 210 of the lower shell acting against the stay 302 on one side and the rim 107 of the upper shell on the other side. As shown, optional friction bumps 502 and 504 are provided to ensure a snap fit. FIG. 5B also shows the holes 304 and 402 for hanging the pot. The holes 304 and 402 may be optional and other methods of hanging the pot may be used.

FIG. 5C is an alternative version of a stay to be used with the pot of FIG. 3. Referring to FIG. 5C, the stay 302 can be seen to align the lip 107 of the upper shell laterally to be even with the edge of the lip 212 of the lower shell. Stays 302 may work in pairs, one each on opposite sides of the pot 100, to center the upper shell 104 within the lower shell 102. As shown, the upper shell 104 is supported vertically by the lip 212 of the lower shell. Alternatively, the upper shell 300 may be vertically supported by the lateral portion 210 of the rim of the lower shell 400 by making the vertical dimension of the stay 302 slightly greater. In a further alternative, the support may be through both the rim 107 and the stay 302.

Figure 5D:
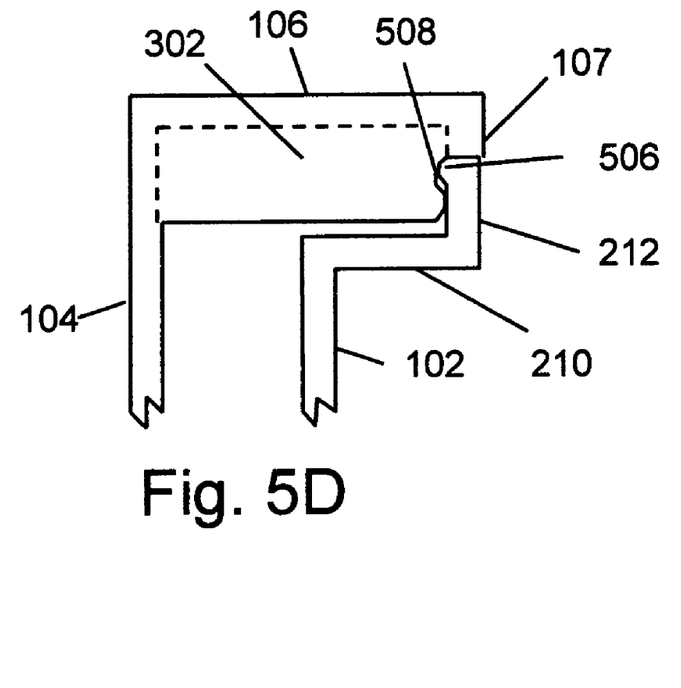

FIG. 5D is an alternative version of the stay of FIG. 3. In FIG. 5C, the stay 302 has a notch 504 which may couple with a ridge 502 in the rim 212 of the lower shell 102 to yield a snap fit. Other techniques may be used to provide alignment, centering and connection of the upper and lower shells as are known in the art.

Figure 6:
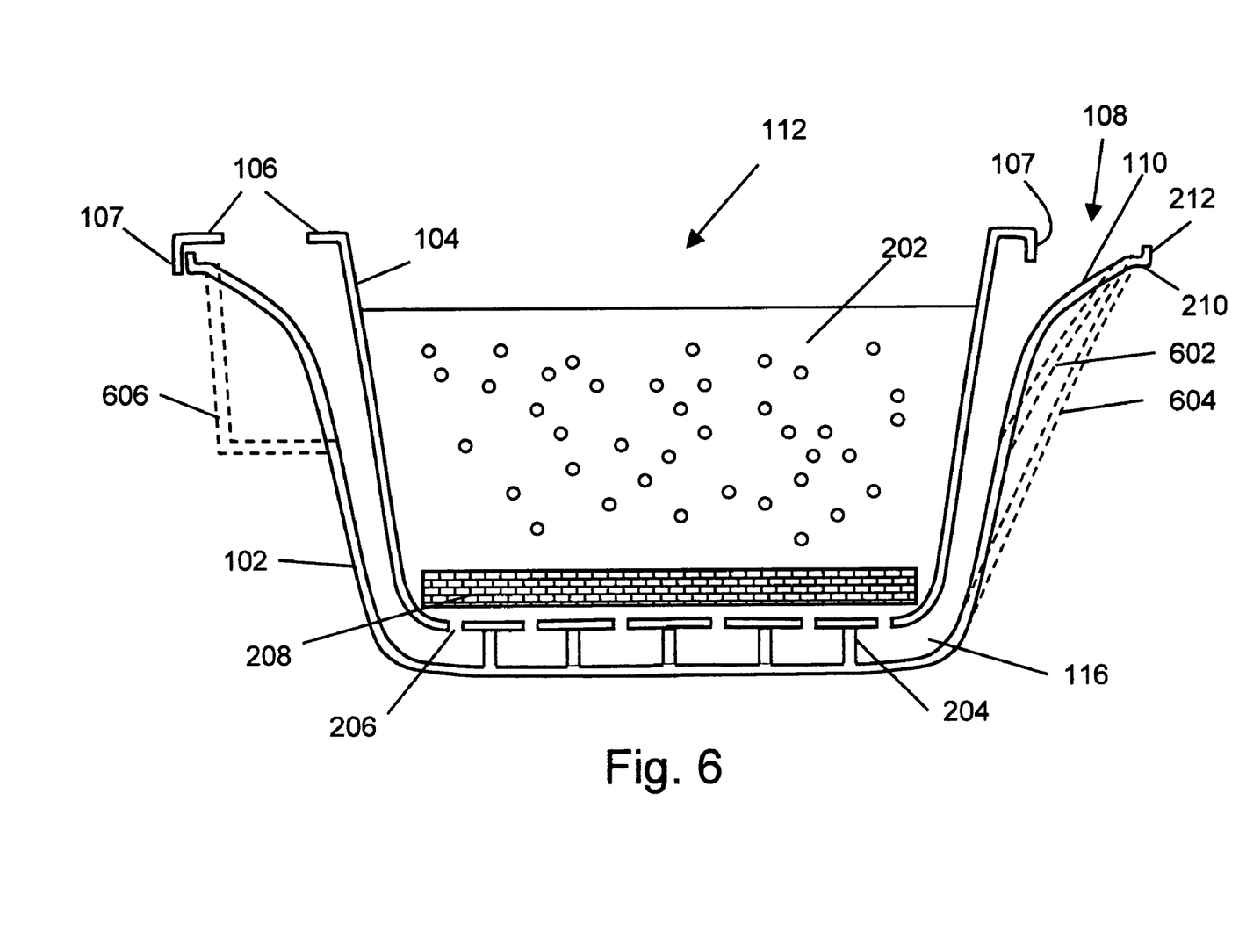
FIG. 6 shows exemplary alternative configurations for the funnel and lip.

FIG. 6 shows exemplary alternative configurations for the funnel and lip. Referring to FIG. 6, the slope of the combination watering funnel and handle 110 may be varied and may intersect the side of the pot at various levels. For example, slope 602 is an alternative to slope 110, intersecting at a lower level. Slope 603 is a further alternative, intersecting at the bottom of the pot. Shape 606 is still another alternative wherein part of the handle has a horizontal slope (zero degree vertical slope). Generally speaking, the handle typically has a portion wherein the vertical slope is less than (more horizontal than) the slope of the wall of the pot at some other radial location at the same elevation from the base.

FIG. 6 also shows an exemplary modified arrangement for the upper shell rim at the funnel. Referring to the right hand side structures, note that the rim runs inside the funnel and there is no watering port in the rim. The watering port is directly into the funnel/handle structure. Note that the watering port should preferably be at the top of the pot, but may be near the top and should be above the half way point in the pot elevation.

The relative arrangement of the rim of the upper and lower shells has the advantage that the upper shell is naturally seated by gravity and that one may pick up the pot by gripping the rim 210 and 212 and lifting by the flat portion 210 of the lower shell rim. Thus, both the upper and lower shells may be lifted without separating the upper shell 104 from the lower shell 102. The pot 100 may thus be carried in one hand. When carrying the pot in one hand, the pot may likely tilt at some angle depending on the plant, soil and water content, but considerable tilt may be tolerated without losing water because the water reservoir sides extend to the top of the pot. Pots with saucers, even if the dish is attached, usually require two trips or both hands to transport a single plant, and often involve spilling water from the saucer at some point.

Alternatively, for plants that must be treated more gently and not tilted, the entire pot 100 including the upper and lower shells may be carried by the handles 110. The handles 110 provide a more horizontal slope than the sides of the pot and include a horizontal rim 210 portion to further assist the grip and handling of the pot 100.

Variations

The plant pot is shown in the exemplary embodiments as being generally round, or circularly symmetric around a vertical axis. The characteristic shape of the pot, as presented by a horizontal cross section through the lower shell, however, may be elliptical, oval, square, rectangular, triangular, hexagonal, octagonal, or some other shape. The cross section may be at mid height, quarter height, three quarter height or near the top of the pot. The watering funnels are formed as protrusions from the characteristic shape of the pot and are formed by a lower, more horizontal, slope of the side of the outer shell. The vertical slope of the watering funnel protrusions may intersect the basic shape of the sides of the pot half way down, as shown, or at some other point, as desired. The watering funnel may extend above the top of the remainder of the pot.

In an alternative embodiment, the funnel protrusion may extend outward from the upper shell lip and the upper shell rim may have no watering port, the watering port being directly into the funnel protrusion without passing through the upper shell rim.

In a further alternative embodiment, the top or bottom rim or lip may be eliminated or the top rim may be fabricated separately from the top body portion. Other similar detail variations may be made in the basic form or construction of the plant pot.

CONCLUSION

Thus, herein described is a plant pot with a water reservoir to extend the time between watering, a plant pot that allows watering without saturating the surface of the soil and that can be carried conveniently as a single assembly.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A plant container comprising:
an upper shell forming a first cavity for soil;
a lower shell forming a second cavity for receiving said upper shell;
said lower shell and said upper shell forming a space between said upper shell and said lower shell, said space for a water reservoir;
said upper shell having holes for passage of water from said water reservoir to said first cavity for soil;
said lower shell being water tight to hold water in said water reservoir;
said upper shell having an upper shell body portion forming said first cavity, and said lower shell having a lower shell body portion forming said second cavity;
said lower shell having one or more funnel regions at the top of said plant container around an upper perimeter of said lower shell body portion, said funnel regions for receiving water and directing said water to said space for said water reservoir, said lower shell having one or more non-funnel regions around said upper perimeter of said lower shell body portion between said one or more funnel regions; said one or more funnel regions characterized by said lower shell forming a radial protrusion in said lower shell body portion wherein said upper perimeter of said lower shell body portion protrudes outward from an upper perimeter of said upper shell body portion a greater distance than a separation distance between said upper perimeter of said upper shell body portion and said upper perimeter of said lower shell body portion within said one or more non-funnel regions.

2. The plant container of claim 1, wherein said lower shell has a horizontal cross section being substantially circular, oval, elliptical, triangular, square, rectangular, hexagonal, or octagonal.

3. The plant container of claim 1, wherein said upper shell further comprises an upper shell rim, said upper shell rim extending horizontally outward from the top of said upper shell body portion and substantially covering said space between said upper shell and said lower shell.

4. The plant container of claim 3, wherein said upper shell rim includes a watering port, said watering port comprising a portion of said upper shell rim having a hole aligned with said radial protrusion of said lower shell, and said watering port allowing an introduction of water through said hole into said water reservoir.

5. The plant container of claim 3, wherein said upper shell includes a lip extending downward from an outer edge of said upper shell rim, and wherein said lower shell includes a lower shell lip extending upward at the top of said lower shell, said lower shell lip contacting said upper shell lip to locate said upper shell relative to said lower shell.

6. The plant container of claim 3, wherein said protrusion of said lower shell extends outward from said upper shell rim.

7. The plant container of claim 5, further including at least one stay fixedly attached to said upper shell rim, said at least one stay contacting said lower shell lip for locating said upper shell relative to said lower shell.

8. The plant container of claim 5, wherein a lower edge of said upper shell lip is in contact with an upper edge of said lower shell lip to rest said upper shell on top of said lower shell lip.

9. The plant container of claim 5, wherein said upper shell rim is outside said lower shell lip to overlap said lower shell lip.

10. The plant container of claim 1, further including a plurality of standoffs separating said upper shell body portion from said lower shell.

11. The plant container of claim 1, wherein said upper shell and said lower shell are permanently attached to one another by adhesive.

12. The plant container of claim 1, wherein said upper shell and said lower shell are permanently attached to one another by plastic welding.

13. The plant container of claim 1, wherein said upper shell and said lower shell are held in contact by friction and are detachable from one another.

14. The plant container of claim 1, wherein said lower shell includes a transparent or translucent window for viewing a water level of said water reservoir.

15. The plant container of claim 1, further including a fiber pad covering a bottom of said upper shell to retain said soil within said first cavity.

16. A method for plant husbandry comprising:
forming a plant container comprising at least a first shell and a second shell, said first shell having a first bottom and a first side, said first bottom and said first side forming a first cavity for containing a growing medium for a plant;
said second shell having a second bottom and a second side, said second bottom and said second side forming a second cavity for receiving said first shell, said second side having a characteristic shape;
forming an extension in said second side of said second shell, said extension extending outward at the top of said second shell, said extension forming a continuous surface with said second shell, said extension extending outward from the characteristic shape of said second shell;
inserting said first shell substantially within said second shell with said first shell disposed with the top of said first shell at the top of said second shell, said first shell and said second shell forming a water reservoir space between said first shell and said second shell; and
forming a rim at the top of said first shell, said rim connecting the top of said first shell and the top of said second shell, said rim allowing entry of water to said water reservoir space using said extension in said second shell;
said first shell having an first shell body portion forming said first cavity, and said second shell having a second shell body portion forming said second cavity;
said second shell having one or more funnel regions around an upper perimeter of said second shell body portion, said funnel regions for receiving water and directing said water to said space for said water reservoir, said second shell having one or more non-funnel regions around said upper perimeter of said second shell body portion between said one or more funnel regions; said one or more funnel regions characterized by said second shell forming a radial protrusion in said body portion of said second shell wherein said upper perimeter of said second shell protrudes outward from said first shell body portion a greater distance than a separation distance between said first shell body portion and said second shell body portion within said one or more non-funnel regions.

17. The method according to claim 16, wherein said characteristic shape of said second shell is one of the group consisting of a circular shape, oval shape, elliptical shape, triangular shape, square shape, rectangular shape, hexagonal shape, and octagonal shape.

18. The method according to claim 16, wherein said extension includes a portion of said extension having a slope more horizontal than the slope of a non-extended portion of said second shell.

19. The method according to claim 16, including the step of forming a port in said rim at the top of said first shell for introduction of water into said water reservoir space.

20. The method according to claim 16, wherein the step of forming an extension includes the step of extending said second side of said second shell beyond said first shell to allow introduction of water into said water reservoir space.

\* \* \* \* \*